US009547420B1

(12) United States Patent
Cassidy et al.

(10) Patent No.: US 9,547,420 B1
(45) Date of Patent: Jan. 17, 2017

(54) SPATIAL APPROACHES TO TEXT SUGGESTION

(71) Applicant: Amazon Technologies, Inc., Reno, NV (US)

(72) Inventors: Ryan Hastings Cassidy, Seattle, WA (US); Robert King Myers, Santa Cruz, CA (US)

(73) Assignee: Amazon Technologies, Inc., Reno, NV (US)

( * ) Notice: Subject to any disclaimer, the term of this patent is extended or adjusted under 35 U.S.C. 154(b) by 212 days.

(21) Appl. No.: 13/764,491

(22) Filed: Feb. 11, 2013

(51) Int. Cl.
*G06F 3/048* (2013.01)
*G06F 3/0484* (2013.01)

(52) U.S. Cl.
CPC .................................. *G06F 3/0484* (2013.01)

(58) Field of Classification Search
CPC ....... G06F 3/0237; G06F 3/018; G06F 3/0233
USPC ................................................ 715/780, 816
See application file for complete search history.

(56) References Cited

U.S. PATENT DOCUMENTS

| | | | |
|---|---|---|---|
| 2009/0187846 A1* | 7/2009 | Paasovaara | 715/780 |
| 2009/0193334 A1* | 7/2009 | Assadollahi | 715/261 |
| 2011/0161311 A1* | 6/2011 | Mishne | G06F 17/30864 707/719 |
| 2011/0201387 A1* | 8/2011 | Paek et al. | 455/566 |
| 2014/0108992 A1* | 4/2014 | Bi et al. | 715/773 |

* cited by examiner

*Primary Examiner* — Ajay Bhatia
*Assistant Examiner* — Phuong Nguyen
(74) *Attorney, Agent, or Firm* — Polsinelli LLP

(57) ABSTRACT

A user wanting to enter text via a computing device can start entering characters for that text. A text suggestion algorithm can be used to attempt to predict the text the user is typing, and provide options for completing the text entry. Information such as the type of suggestion and common roots for those suggestions can be used to group at least some of the suggestions. An interface element with a spatial layout can be provided to display at least a portion of the suggestions, where the suggestions are arranged according to their relative confidence values and the determined groupings. The font values for each of the displayed suggestions can also be set using the confidence values, such that more likely terms can be displayed with a larger and/or more prominent font in order to allow the user to more easily locate the correct suggestion.

24 Claims, 8 Drawing Sheets

SPATIAL APPROACHES TO TEXT SUGGESTION

BACKGROUND

People are increasingly relying on computing devices for performing a variety of tasks. Many of these tasks allow users to enter information that can be utilized and/or processed for a number of different purposes. Oftentimes, however, a user might make a mistake in entering text, particularly where the user is using a portable computing device with a small physical or virtual keyboard. Even when the user does not make a mistake, however, the amount of time it takes to enter a long string of text can be undesirable for many users. Conventional approaches address some of these concerns by suggesting text that completes and/or corrects the portion of text entered by a user. For example, if a user enters two characters of a word in a text box, software can attempt to predict the word or phrase the user is in the process of entering, and suggest one or more options to the user. Oftentimes, however, these suggestions are displayed through a one-dimensional list of words of equivalent weight or emphasis, which can make it difficult, or at least time consuming, for a user to find the correct word. If the user cannot quickly locate the correct word, the user might not save any time over manually completing the entry of the word.

BRIEF DESCRIPTION OF THE DRAWINGS

Various embodiments in accordance with the present disclosure will be described with reference to the drawings, in which.

DETAILED DESCRIPTION

Approaches in accordance with various embodiments of the present disclosure overcome one or more of the aforementioned and other deficiencies experienced in conventional approaches to suggesting completion and/or correction text via an electronic device. In particular, approaches discussed herein utilize various approaches to arranging and/or displaying text suggestions in order to allow a user to more quickly and easily locate an appropriate text suggestion. In at least some embodiments, text suggestions received from at least one text suggestion algorithm can be separated by type, such as completion and correction option types. The suggestions can also be analyzed to locate or group suggestions with common roots or common base portions. A confidence score or other ranking or measure for each term from the at least one algorithm also can be determined. Based at least in part upon the type of suggestion, the determined groupings, and the respective confidence scores of the suggestions, a spatial layout can be determined that emphasizes terms with higher confidence values. Various fonts, font faces, weights and/or sizes, underlining, italics, colors, or other aspects can be set for the displayed terms as well to assist with the relative emphasis. Further, displaying suggestions together that have common roots or base portions can enable the user to more quickly locate a specific word including one of those base portions. The font characteristics of each of the grouped words can be set to provide an indication of the relative confidence or likelihood that a suggestion will be the correct word. In some embodiments only a portion of the suggestions will be displayed, and as a user moves towards certain displayed words, using a finger or other object, related or similar words can appear dynamically such that a user can more quickly locate the word of interest while only showing a relatively small number of suggestions on the interface at any given time, which can help to simplify the selection process.

Many other alternatives and variations are described and suggested below in relation to at least some of the various embodiments.

Figure 1A:
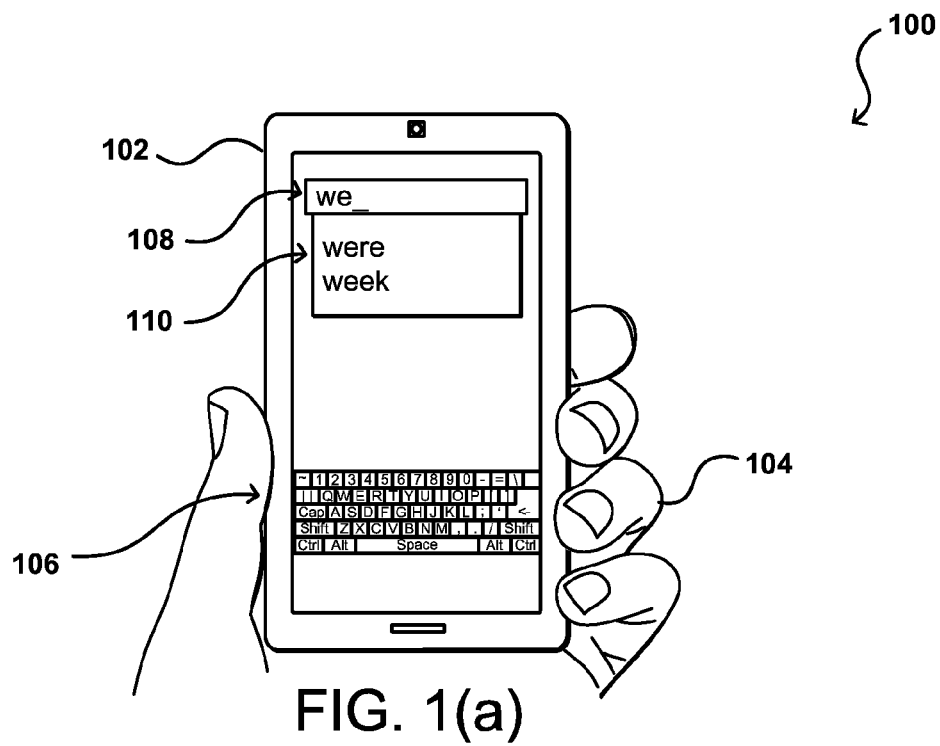
FIGS. 1(a) and 1(b) illustrate an example approach to suggesting completion or correction text that can be utilized in accordance with various embodiments.

FIG. 1(a) illustrates an example situation 100 wherein a user is entering text into a text box 108 of a user interface. Although a portable computing device 102 (e.g., a portable media player, smart phone, or tablet) is shown that can be held in a user's hand 104, it should be understood that other types of computing devices can utilize aspects of the various embodiments as should be apparent in light of the teachings and suggestions contained herein. As illustrated, the computing device has a virtual keyboard 106 displayed on a touch-sensitive display screen of the device, such that the user can enter text by contacting a corresponding area of the touch screen with a finger or other such object. Swipe, gesture, or hover entry can be used within the scope of the various embodiments, and in some embodiments the device might have a physical keyboard or keypad as well. Various other approaches to entering text can be used as known in the art, within the scope of the various embodiments.

As mentioned above, factors such as the small size of the keyboard 106 relative to the size of a user's finger can make it difficult for a user to accurately enter text via the device. Accordingly, many devices include applications or code that can suggest one or more text completion options 110 to a user as a user enters text into a device. In some embodiments the suggestions can be presented and/or updated each time a user enters, deletes, or updates at least one character, with progressive updates as more characters are entered, or there might need to be one or more suggestions with at least a minimum level of confidence or certainty, among other such options. Options with low confidence may be elided altogether. In this example, the software has analyzed the two characters entered by the user, and using an appropriate data store or library has determined two word suggestions to present to the user based at least in part upon those characters. As known in the art, text suggestions might be based upon factors such as frequency of occurrence, use by other users, use by the particular user, use within a current context, or other such information.

Figure 1B:
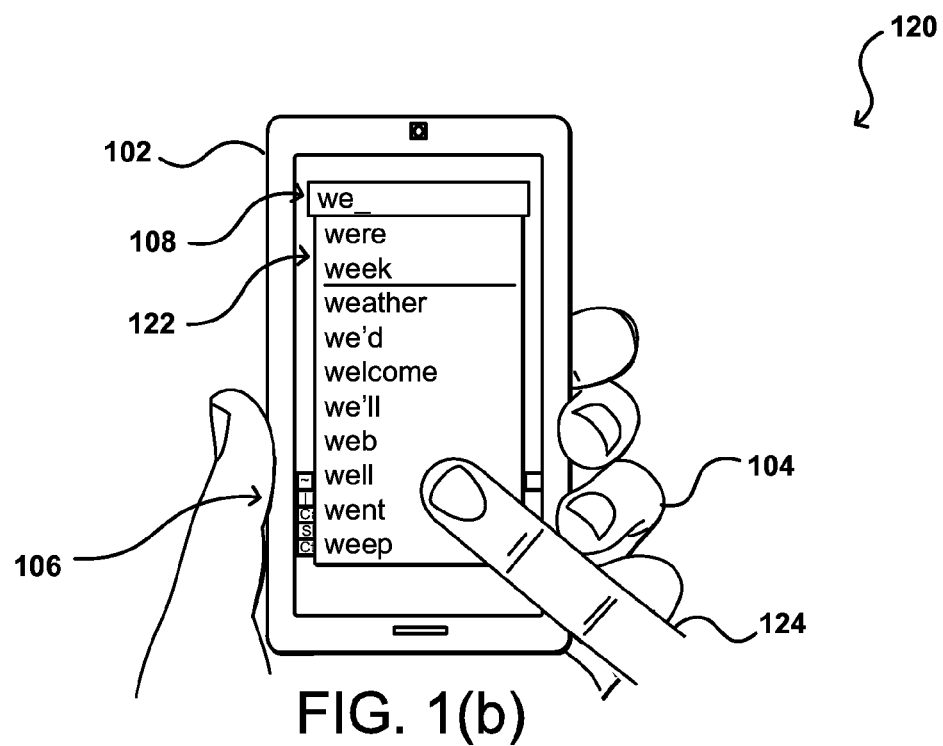

FIG. 1(b) illustrates a similar situation 120, wherein the device lists additional suggestions based on the entered text. The device might automatically display many options when they are determined to be at least somewhat relevant, or might display additional suggestions in response to user input. In any case, it can be seen that the lists 110, 122 displayed in both cases are one-dimensional lists that are presented based upon a relevance or confidence score, or other such measure. The suggestions are not grouped based on similarity or organized in any way so at to be able to determine the relative confidence of each, other than potentially a simple ranking. A user wanting to select a specific option might have to read the entire list of options, which might involve scrolling through the list in some embodiments, in order to select one of the options using a finger 124 or other such object.

While predictive algorithms are continually getting stronger, displaying the resulting suggestions as words of equivalent weight provides little guidance to the user. Approaches in accordance with various embodiments instead provide a spatial layout of suggestions that is organized and presented in such a way that the relative confidence or likelihood of a suggestion can readily be determined based upon factors such as the size and font of each suggestion. Words sharing a common root or base can also be grouped together, such that when the user's eyes are drawn to a word that is close to the suggestion the surrounding words will likely be near to the correct suggestion, enabling the user to more quickly locate the precise choice. Various types of suggestions also can be grouped together or presented in similar areas, such that if a user is looking for a correction term instead of a replacement term the user can quickly reduce the size of the search space to that portion of the interface that presents that type of term.

Figure 2A:
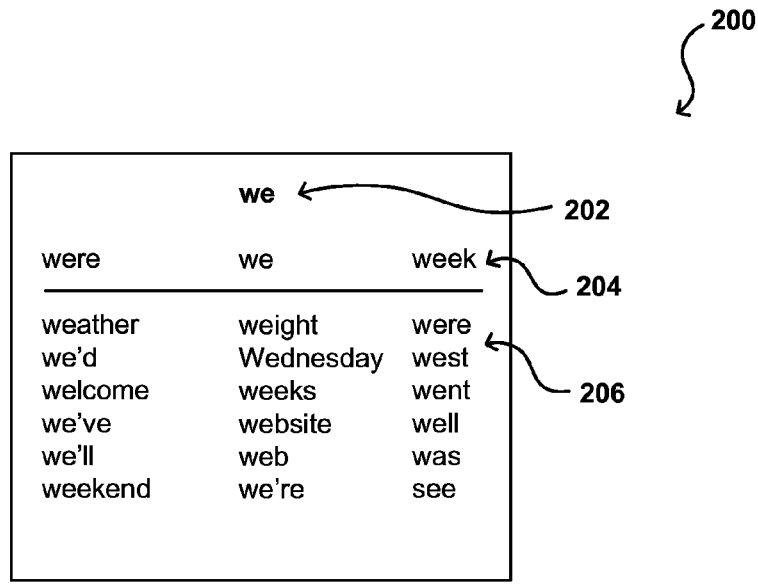
FIGS. 2(a) and 2(b) illustrate an approach to arranging and/or grouping text options to be suggested to a user that can be utilized in accordance with various embodiments.

As an example, FIG. 2(a) illustrates an example set of suggestions 200 that might be provided by a conventional suggestion algorithm available for determining suggestions on existing and/or future devices. Various other types of suggestion algorithms can be used as well. The current characters 202 entered are shown, along with the three most likely suggestions 204, as may be based on confidence scores or likelihoods, as discussed elsewhere herein. In this case, the current characters 202 form a word in their own right, and thus can be selected as such. The set of suggestions also includes additional suggestions 206 that might not be as likely, or meet a specified suggestion criterion, but that are determined to be possible suggestions for the entered characters, as may also meet some minimum certainty or likelihood criteria, etc. As illustrated, the majority of the suggestions are grouped together with no easy way for the user to determine which suggestions are more likely, locate similar suggestions, etc.

Figure 2B:
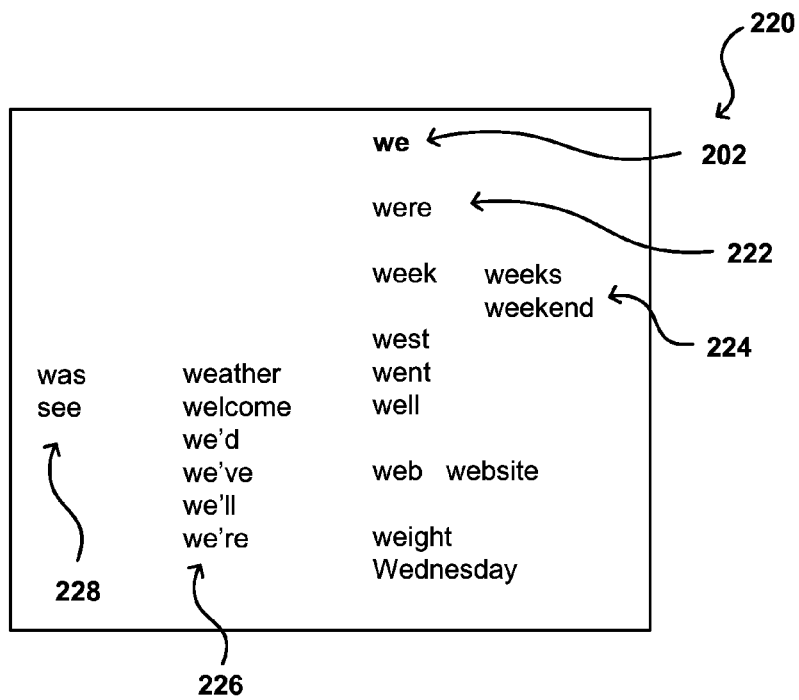

Accordingly, FIG. 2(b) illustrates a logically organized version 220 of the set of suggestions using an approach in accordance with at least one embodiment. The actual layout illustrated may not actually be generated, but the illustration shows logical groupings and/or separations upon which layouts can be generated. In this example, the entered characters 202 are again indicated, with the suggestions 222 listed under that being likely suggestions, ordered from top to bottom. As can be seen, one of these terms ("week") is also the root for two other terms 224, namely "weeks" and "weekend." These terms are logically grouped together, as a user looking for one of these terms might be able to locate that term more quickly if all the terms with that root are displayed together, particular where the root is more likely and can be displayed more prominently. Derived words can be clustered behind the respective root, with a cumulative confidence score or other such value used to size the root. Other similar terms, such as "web" and "website" can be grouped together as well. A separate column of terms 228 might be generated where those terms are still suggestions, but are less likely than the already mentioned terms 222. As discussed later herein, these might be secondary terms that are displayed less prominently or only when a user navigates for additional options. Another column of terms 228 is displayed to the left, where these terms are "correction" instead of "completion" terms. As can be seen, "was" would require correction of the "e" and "see" would require correction of the "w". These might be common mistakes, as can be determined using any of a number of conventional text analysis approaches. Separating the corrections from the completions can allow each group to be displayed in separate regions, which can help the user to more quickly locate the correct suggestion. As should be apparent, various other similarities or differences can be utilized for separation or grouping of terms within the scope of the various embodiments.

Figure 3:
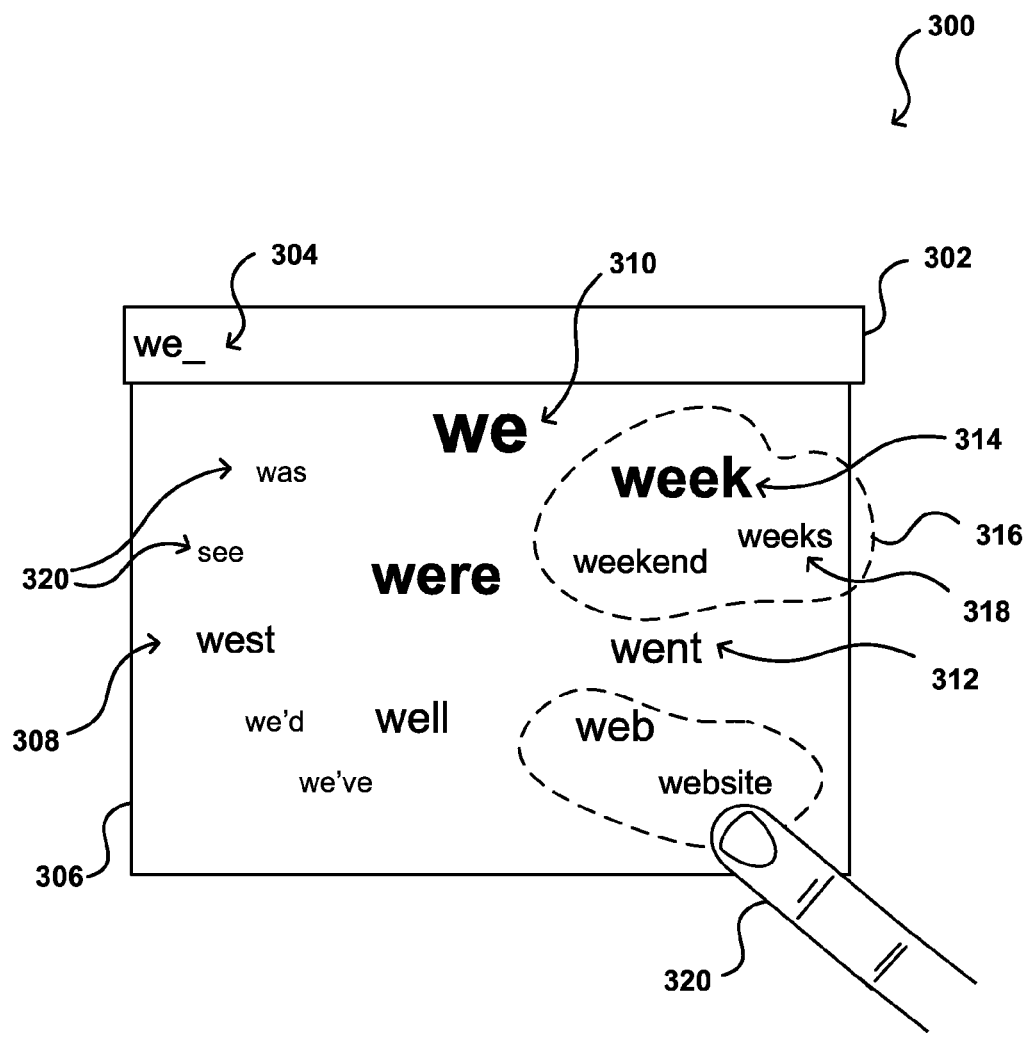
FIG. 3 illustrates an example spatial layout of text suggestions that can be utilized in accordance with various embodiments.

Once the suggestions are logically grouped, separated, or otherwise organized, a spatial layout of the terms can be provided using a suggestion panel or other such interface element. For example, FIG. 3 illustrates an example interface portion 300 wherein a user has typed two characters ("we") into a text box 302, as discussed previously. Since "we" is actually a complete word, it might also be the most likely suggestion such that the suggestion 310 is displayed near the top, in the center, with a large bolded font, to indicate the high likelihood and make it easy for the user to find. The other most likely completion suggestions, "were" and "week" can be located towards the right in this example, which is dedicated to completion types, but also close to the top/center and in relatively large, bold, or colored fonts, in order to enable the user to quickly locate those options. In this example, font size decreases with a decrease in likelihood or confidence scores, as a next most likely term "went" 312 is displayed with smaller font and no bolding, for example. While lower confidence words might also be located further away from the text entry, space constraints can cause the smaller or less likely words to be filled in the spaces between the more likely words of larger font, in at least some embodiments.

As illustrated, correction type suggestions 320 are displayed towards the left of the panel and grouped together such that if the user is looking for a correction the user's eyes will be more likely drawn toward the correction options. Similarly, words with common words can be grouped together regardless of their confidence scores. For example, word with the root word "week" are positioned in a region 316 around the word "week" 314, which has a high likelihood or confidence and is thus displayed with relatively prominent font settings. Thus, if a user is looking for the suggestion "weeks," the user might be more likely to locate the suggestion 318 which might have a small font size or otherwise be less prominently displayed, but due to its proximity to the root "week" might be relatively quick to locate. As illustrated, the various suggestions are spaced far enough apart such that a finger 320 of a user, upon touching the screen or otherwise making a selection, can easily select a single suggestion without substantial ambiguity in the selection. It should be understood that various other spatial layouts, font differences, arrangements, groupings, and other options can be utilized as well within the scope of the various embodiments.

Further, in at least some embodiments a device can determine whether to display a keyboard or a spatial layout interface based at least in part upon the distance between the user's head or eyes and the device, as may be determined using captured images, ultrasonic sensors, or other such approaches. The distance can determine how easy it will be for the user to enter text using a keyboard, for example, enabling the device to determine when it might be advantageous to use the spatial layout or another such interface. A user can control the selective display of the basic virtual keyboard input device versus the display of an "overlaid" spatial layout using such a flexible interactive technique. In some embodiments, head tracking can be utilized to measure the distance between the device and the user's head, and the spatial layout can be "focused in" over the keyboard, and "focused out" to reveal the keyboard functionality, as the user brings the display closer and further, respectively, from the user's eyes. This allows a very agile approach to sharing the limited screen real estate for character entry and for word choice.

Figure 4A:
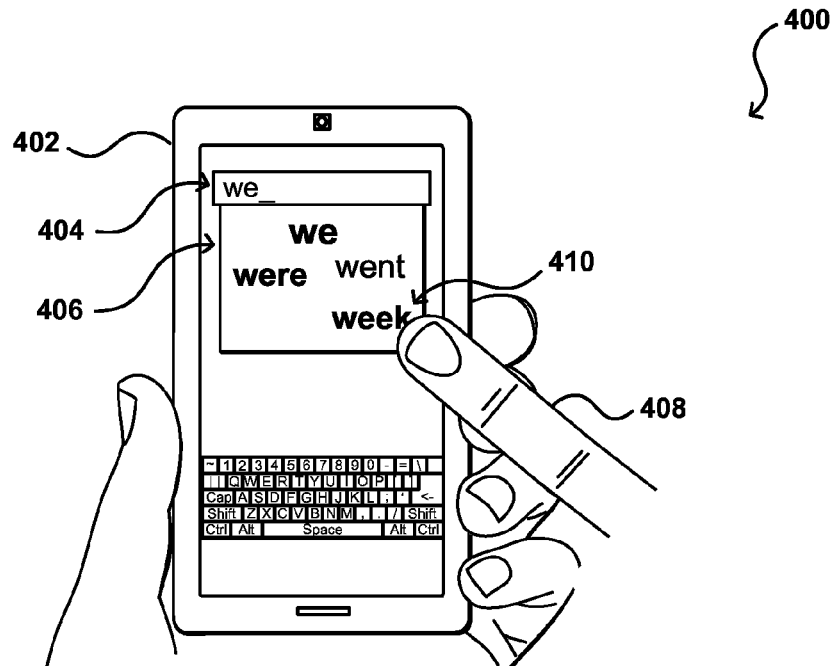
FIGS. 4(a) and 4(b) illustrate an example of a dynamic spatial layout of text suggestions that can be utilized in accordance with various embodiments.
Figure 4B:
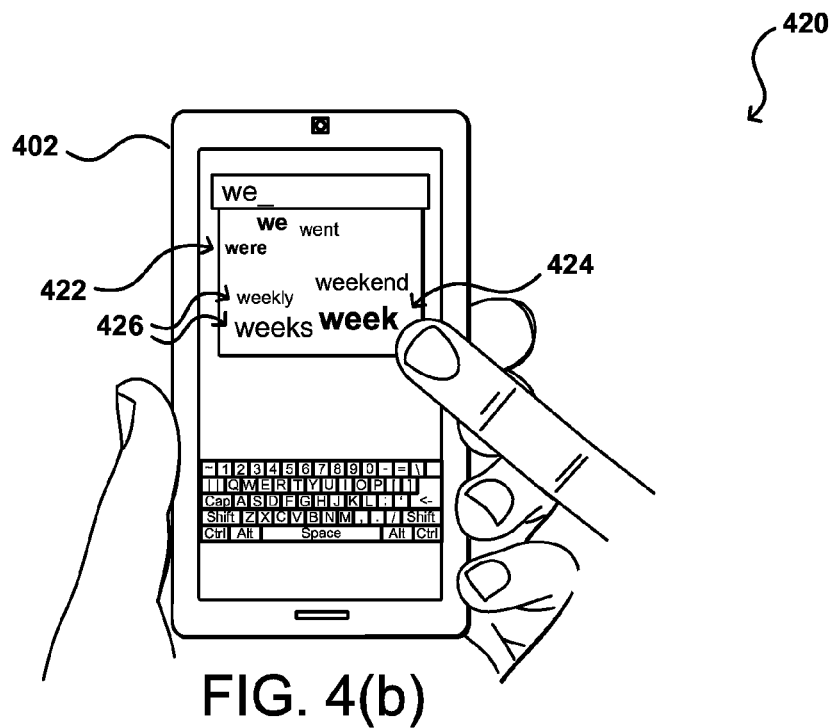

As mentioned, in some embodiments the amount of area might be limited, such that only a relatively small number of suggestions can be displayed at any time. In other embodiments, the software might attempt to guide the user to the appropriate selection based upon user selections, indications, or inputs. Accordingly, FIGS. 4(a) and 4(b) illustrate an example approach wherein the display of suggestions is updated dynamically. Initially, a selection of the mostly likely suggestions is displayed in a suggestion element 406 when a user enters one or more characters into a text element 404 of an interface on a computing device 402. The selected words can still be arranged according to a spatial layout as discussed herein, with differences in font size or appearance in at least some embodiments. The user can utilize a finger 408 or other such object to interact with the suggestion element, such as to move towards one 410 of the suggestions. In some embodiments the user can swipe to, or contact, the region with the selection 410, while in embodiments where the user is providing motion or gesture input at a distance from the screen the user can move the finger laterally (i.e., substantially parallel to the display screen) to a position corresponding to the selection.

In response, the interface can update the selection and/or rendering to focus more on words or suggestions related, or similar, to the selection. For example, in the situation 420 of FIG. 4(b) the interface has moved the unselected terms 422 away from the finger location, and has added suggestions 426 to the display that are similar to the selection 424. This dynamic adjustment can help the user to locate a term of interest, as the user can continue moving the finger in a direction that gets closer to the term of interest until the user locates the word, at which time the user can select the word. For example, if the word of interest is "weekends" the user can first move to "week" as in FIG. 4(a), which can cause the term "weekend" to appear, as in FIG. 4(b). In some embodiments, the font values for "week" might update as well, to indicate the increase in likelihood due to finger proximity, etc. The user could then move the finger towards "weekend," which could cause the term "weekends" to appear. At that point, the user can move the finger towards, and select, the term weekends. In at least some embodiments, a user can use such an interface to type with minimal use of a keyboard, or if letters start off in an initial phase of the suggestion element no keyboard might be needed, as the user can move towards the letter of interest and then keep moving until the desired word or term is selected.

Figure 5:
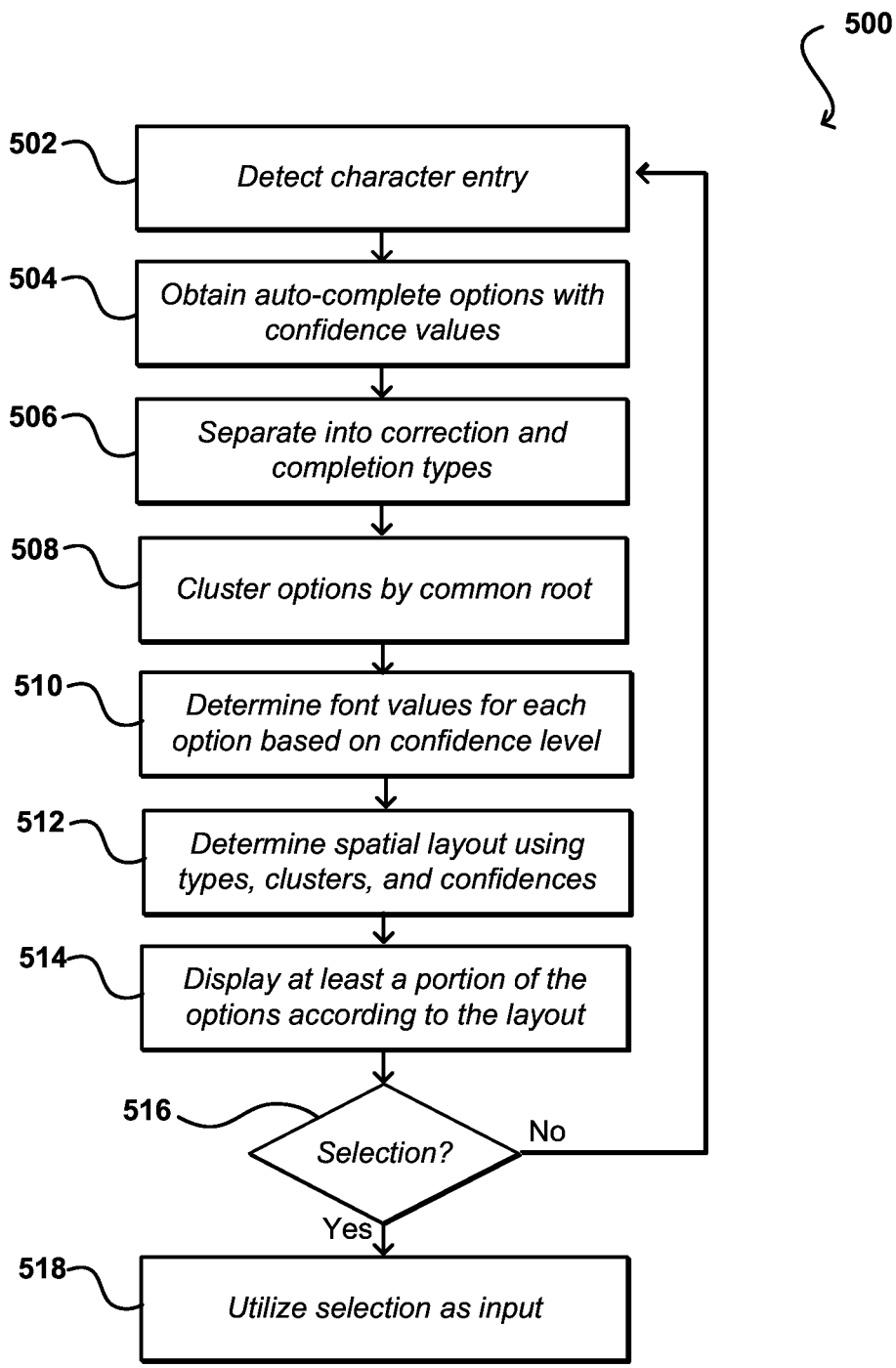
FIG. 5 illustrates an example process for arranging and presenting text suggestions that can be utilized in accordance with various embodiments.

FIG. 5 illustrates an example process 500 for suggesting text options to a user that can be utilized in accordance with various embodiments. It should be understood, however, that there can be additional, fewer, or alternative steps performed in similar or alternative orders, or in parallel, within the scope of the various embodiments unless otherwise stated. In this example, entry of one or more characters is detected 502 by a computing device. As discussed, some embodiments might require more than one adjacent alphanumeric character before performing an auto-completion suggestion, among other such options or criteria. The characters can be entered using a keyboard, keypad, gesture entry, voice recognition, or any other appropriate input. Information for the character(s) can be fed to at least one text suggestion, text completion, or other such algorithm, which can be located on the device or on a remote system or service in communication with the device. A set of suggestions can be received 504, along with confidence values, likelihood values, or other such information useful in determining a relative correctness of each of the suggestions. As discussed, the suggestions can include one or more correction type suggestions as well.

Once the suggestions are obtained, a number of steps can be performed in any particular order, or at least partially concurrently. These can include, in this example, separating 506 the suggestions into completion and correction types, and clustering 508 suggestions having a common root or common base portion. For example, the words "child," "childlike," and "children" all share the same common base portion "child." The process also can include analyzing the confidence values for at least a portion of the suggestions and determining 510 one or more font values for each of those suggestions, where the font values can correspond to options such as font size, boldness, italics, color, case, font style, and the like. Based at least in part upon information such as the groupings, suggestion types, and relative confidences, a spatial layout can be determined 512 that includes at least a portion of the suggestions. As mentioned, the layout can vary based upon factors such as the type of device, current resolution settings, and other such information. At least a portion of the suggestions then can be displayed 514 according to the selected layout. As discussed, the layout may be static or dynamic in at least some embodiments, and the amount of information displayed initially can be based at least in part upon whether the layout is dynamic. If selection of one of the suggestions is selected 516 as input, that selection can be utilized 518 as input for the current element, such as a text box, search field, etc. If not, the process can continue as the user moves across the suggestions or enters additional characters, for example, which can cause the displayed suggestions to update in at least some embodiments. Such an approach provides multiple degrees of freedom that can be used to emphasize, or de-emphasize, various suggestions to a user based on confidence values, related suggestions, and other such information.

Figure 6A:
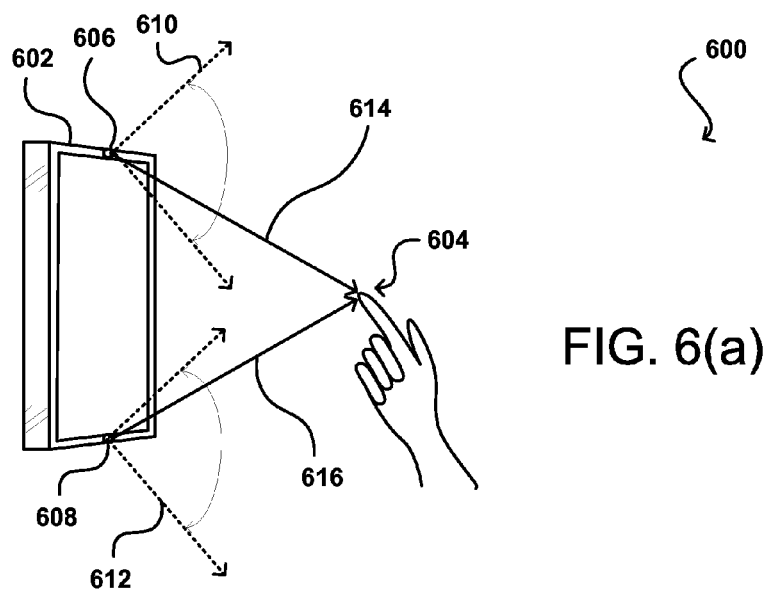
FIGS. 6(a), 6(b), 6(c), and 6(d) illustrate example approaches to determining the position of a finger or other object for use with a spatial layout in accordance with various embodiments.
Figures 6B, 6C:
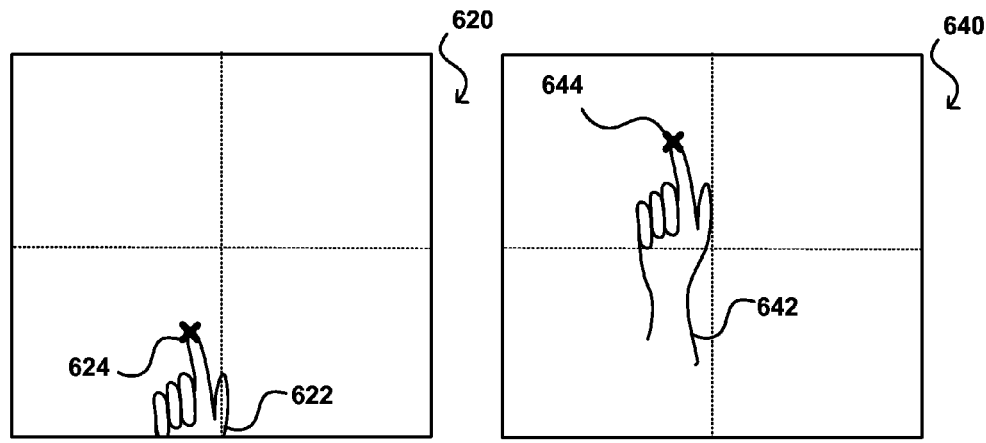
Figure 6D:
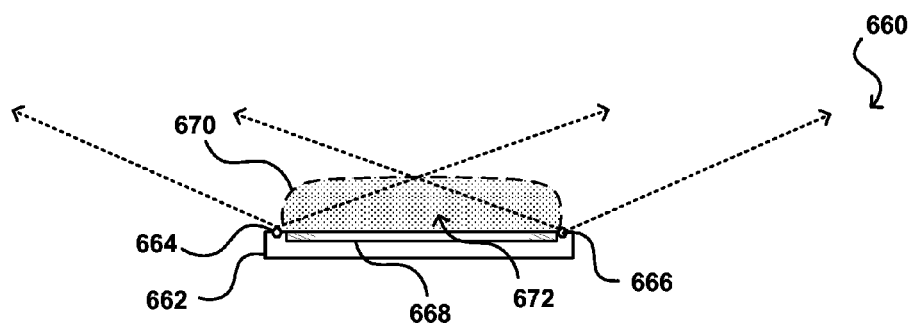

As mentioned, in some embodiments the user can make selections by contacting a touch screen, using a mouse or keyboard, or using another such conventional input. In at least some embodiments, a user can provide input at a distance from the device using one or more motions or gestures performed using a feature such as a user's finger. In order to determine the location of one or more features of the user with respect to a display or other such element of a computing device, a number of potential approaches can be used. FIGS. 6(*a*), (*b*), (*c*), and (*d*) illustrate one example approach to determining a relative distance and/or location of at least one feature of a user that can be utilized in accordance with various embodiments. In this example, input can be provided to a computing device 602 by monitoring the position of the user's fingertip 604 with respect to the device, although various other features can be used as well as discussed and suggested elsewhere herein. In some embodiments, a single camera can be used to capture image information including the user's fingertip, where the relative location can be determined in two dimensions from the position of the fingertip in the image and the distance determined by the relative size of the fingertip in the image. In other embodiments, a proximity detector or other such sensor can be used to provide the distance information. The illustrated computing device 602 in this example instead includes at least two different image capture elements 606, 608 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 606 is able to see the fingertip 604 of the user as long as that feature is within a field of view 610 of the upper camera 606 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 614 of the fingertip with respect to the upper camera. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 608 in FIG. 6(*a*) is also able to image the fingertip 604 as long as the feature is at least partially within the field of view 612 of the lower camera 608. Using a similar process to that described above, appropriate software can analyze the image information captured by the lower camera to determine an approximate direction 616 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance to a feature of a user. For example, a device can determine the size of a feature (e.g., a finger, hand, pen, or stylus) used to provide input to the device. By monitoring the relative size in the captured image information, the device can estimate the relative distance to the feature. This estimated distance can be used to assist with location determination using a single camera or sensor approach.

Further illustrating such an example approach, FIGS. 6(*b*) and 6(*c*) illustrate example images 620, 640 that could be captured of the fingertip using the cameras 606, 608 of FIG. 6(*a*). In this example, FIG. 6(*b*) illustrates an example image 620 that could be captured using the upper camera 606 in FIG. 6(*a*). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 622, at least one point of interest 624, here the tip of the user's index finger, is determined. As discussed above, the software can use the location of this point with information about the camera to determine a relative direction to the fingertip. A similar approach can be used with the image 640 captured by the lower camera 608 as illustrated in FIG. 6(*c*), where the hand 642 is located and a direction to the corresponding point 644 determined. As illustrated in FIGS. 6(*b*) and 6(*c*), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 6(*a*), however, there can be a region near the surface of the screen that falls outside the fields of view of the cameras on the device, which creates a "dead zone" where the location of a fingertip or other feature cannot be determined (at least accurately or quickly) using images captured by the cameras of the device.

FIG. 6(*d*) illustrates an example configuration 660 wherein the device 662 includes a pair of front-facing cameras 664, 666 each capable of capturing images over a respective field of view. If a fingertip or other feature near a display screen 668 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component or at least one ultrasonic transceiver (or at least one emitter and at least one separate receiver). A capacitive touch detection component can detect position at or near the surface of the display screen, and by adjusting the parameters of the capacitive touch detection component the device can have a detection range 670 that covers the dead zone and also at least partially overlaps the fields of view. An ultrasonic approach can cover the dead zone and potentially take the place of the camera(s) in various embodiments. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

In at least some embodiments the process can learn user preferences or habits over time, and can adjust the weightings, confidence values, or layouts accordingly. Model building and updating can be performed on the device or via a remote service, using data from the user and/or other users. A feedback loop can be used to continually update and improve information, layouts, recommendations, and other such information.

Figure 7:
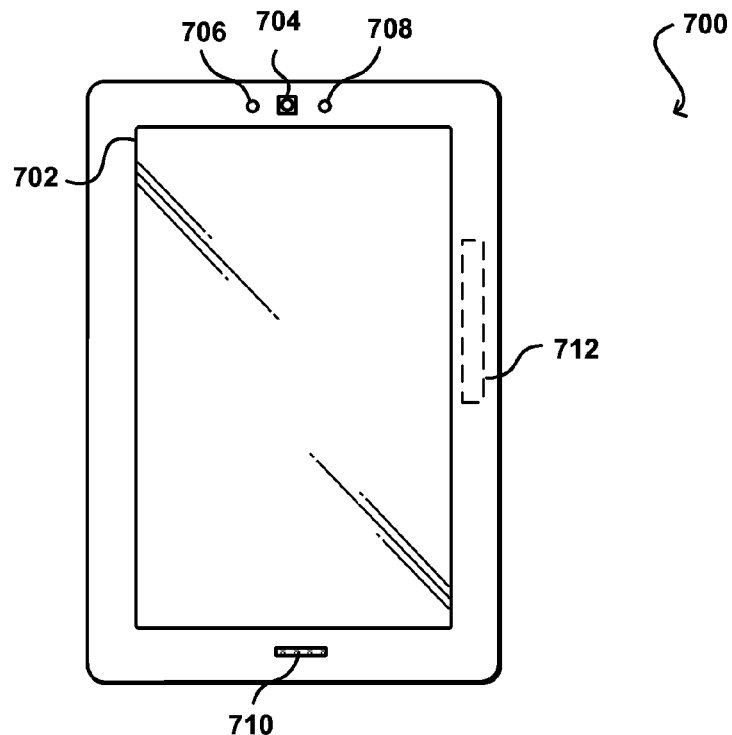
FIG. 7 illustrates an example computing device that can be utilized in accordance with various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The display screen can be a touch sensitive screen that utilizes a capacitive touch-based detection approach, for example, that enables the device to determine the location of an object within a distance of the display screen. The device also includes at least one communication component 712 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The device also includes a light sensor 706 and an illumination element 708, such as a white light or infrared (IR) LED for providing illumination to assist with image capture based at least in part upon current environmental conditions.

The example computing device 700 also includes at least one microphone 710 or other audio capture device capable of capturing audio data, such as words or commands spoken by a user of the device. In this example, a microphone is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 8:
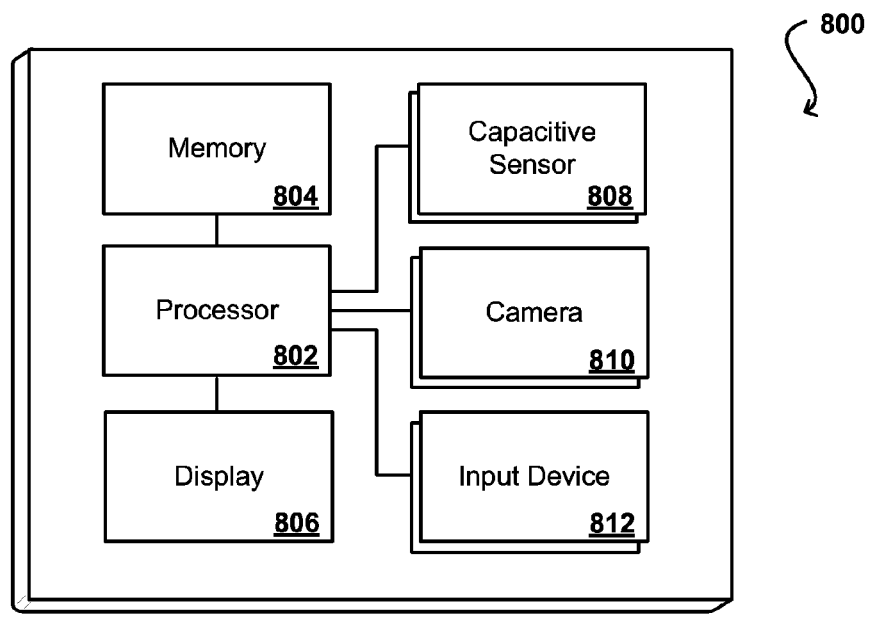
FIG. 8 illustrates an example set of components that can be utilized in a device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include one or more cameras or camera sensors 810 for capturing image or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 800 includes at least one capacitive component 808 or other proximity sensor, which can be part of, or separate from, the display assembly. In at least some embodiments the proximity sensor can take the form of a capacitive touch sensor capable of detecting the proximity of a finger or other such object as discussed herein. The computing device can include one or more communication elements or networking sub-systems, such as a Wi-Fi, Bluetooth, RF, wired, or wireless communication system. The device in many embodiments can communicate with a network, such as the Internet, and may be able to communicate with other such devices. In some embodiments the device can include at least one additional input device 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

Figure 9:
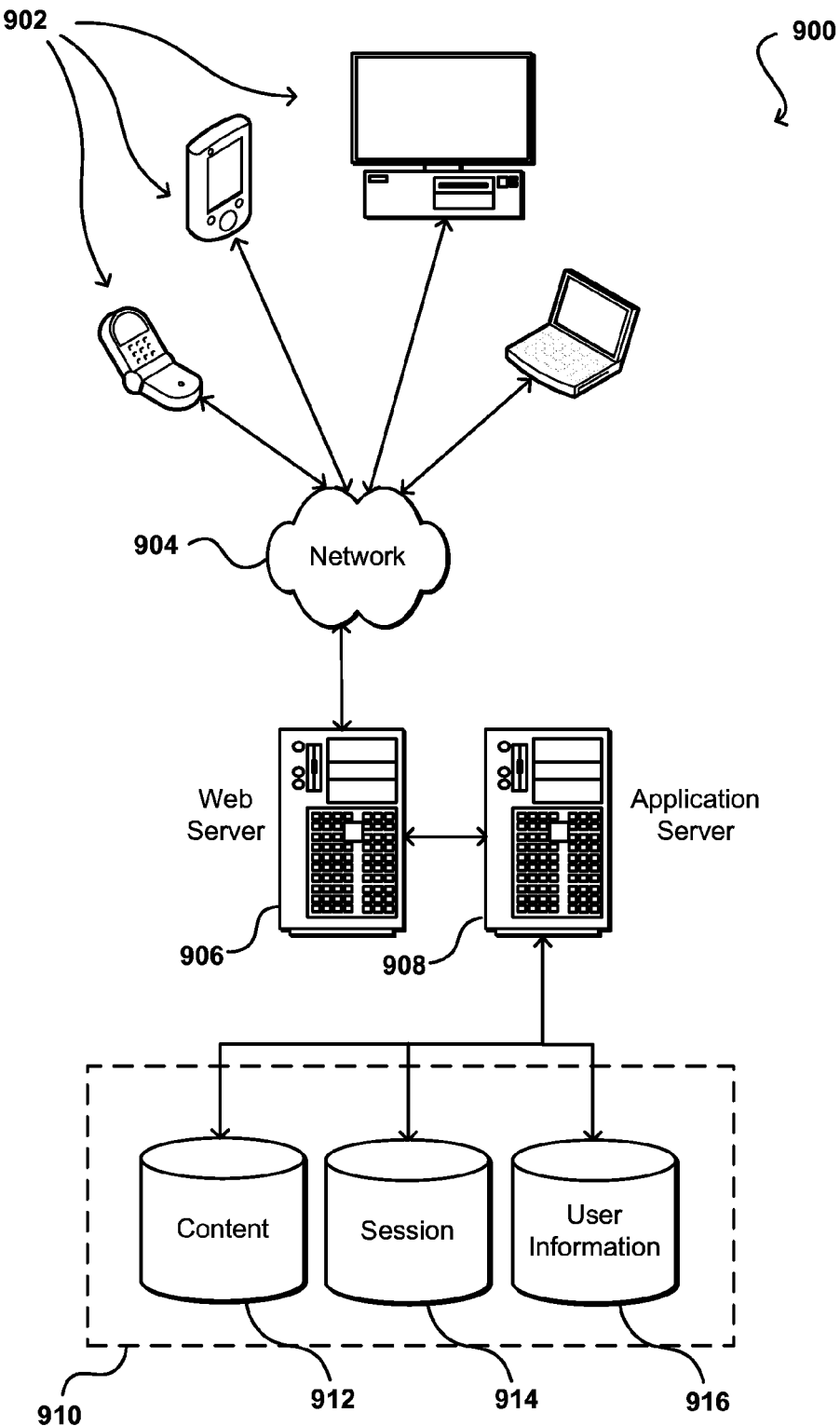
FIG. 9 illustrates an example an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of suggesting text via a computing device, comprising:
    receiving character input in a text entry element of an interface of a computing device;
    analyzing the character input to determine a plurality of suggestions, the plurality of suggestions are based at least in part upon the character input, the suggestions having respective confidence scores, wherein a first suggestion of the plurality of suggestions is designated as one of a correction type, a common base portion type, or a completion type, the common base portion type including at least a root word, the completion type including at least a corresponding completing word;
    determining a two-dimensional spatial layout of at least a portion of the plurality of suggestions, a location in the spatial layout being determined based, at least in part, upon a grouping of the suggestions and a confidence score of the suggestions, wherein first suggestions that share a same completion type are grouped together in a first group, second suggestions that share a same correction type are grouped together in a second group, and third suggestions that share a same common base portion type are grouped together in a third group;
    displaying the at least the portion of the plurality of suggestions according to the spatial layout, wherein the first suggestions that form the first group, the second suggestions that form the second group and the third suggestions that form the third group are displayed proximate to one another in the spatial layout;

detecting a user selection of a specified selection of the suggestions displayed according to the spatial layout; and modifying the character input in the text entry element according to the specified selection.

2. The computer-implemented method of claim 1, further comprising:

determining at least one font characteristic for a suggestion based at least in part upon the respective confidence score of the suggestion, the font characteristic including at least one of font size, font style, font color, font bold level, font italicize level, font animation, and font angle.

3. The computer-implemented method of claim 2, wherein the respective confidence score for a suggestion is determined by analyzing information collected for a group of users, the information including at least one of corrections or completions made to text entries by one or more of the group of users.

4. The computer-implemented method of claim 1, further comprising:

displaying a second portion of the plurality of suggestions arranged according to the spatial layout, the second portion including one or more additional suggestions related to the specified selection.

5. A computer-implemented method, comprising:

detecting character input in an interface of a computing device;

analyzing the character input to determine a plurality of suggestions, the plurality of suggestions are based at least in part upon the character input, the suggestions having respective confidence scores, wherein a first suggestion of the plurality of suggestions is designated as one of a correction type, a common base portion type, or a completion type, the common base portion type including at least a root word, the completion type including at least a corresponding completing word;

determining a two-dimensional spatial layout of at least a portion of the plurality of suggestions, a location of a suggestion of the portion being determined based, at least in part, upon the respective confidence score of the suggestion, wherein first suggestions that share a same completion type are grouped together in a first group, second suggestions that share a same correction type are grouped together in a second group, and third suggestions that share a same common base portion type are grouped together in a third group;

providing for display the at least the portion of the plurality of suggestions arranged according to the spatial layout, wherein the first suggestions that form the first group, the second suggestions that form the second group and the third suggestions that form the third group are displayed proximate to one another in the spatial layout;

detecting a user selection of a specified selection of the plurality of suggestions displayed according to the spatial layout; and determining a modified character input based at least in part on the specified selection.

6. The computer-implemented method of claim 5, further comprising:

determining at least one font characteristic for a suggestion of the spatial layout based at least in part upon the confidence score of the suggestion.

7. The computer-implemented method of claim 6, wherein the at least one font characteristic includes at least one of font size, font style, font color, font bold level, font italicize level, font animation, or font angle.

8. The computer-implemented method of claim 6, further comprising:

displaying suggestions with greater confidence values closer to a top of the spatial layout than suggestions with lower confidence values.

9. The computer-implemented method of claim 5, wherein a suggestion is designated as one of a correction type or completion type, wherein suggestions of the correction type and suggestions of the completion type are each grouped together in the spatial layout.

10. The computer-implemented method of claim 5, further comprising:

displaying suggestions, having the root word, proximate to each other according to the spatial layout.

11. The computer-implemented method of claim 5, further comprising:

displaying a second portion of the plurality of suggestions arranged according to the spatial layout, the second portion including one or more additional suggestions related to the specified selection.

12. The computer-implemented method of claim 5, wherein the user selection is detected using at least one sensor of the computing device, the at least one sensor including at least one of a camera, a capacitance sensor, a gesture sensor, an infrared sensor, or an ultrasonic sensor.

13. The computer-implemented method of claim 5, further comprising:

providing for display new suggestions arranged according to the spatial layout in response to at least one of addition, deletion, or alteration of at least one character of the character input in the interface.

14. The computer-implemented method of claim 5, wherein determining the plurality of suggestions includes identifying suggestions that have at least a threshold confidence score.

15. The computer-implemented method of claim 5, wherein a font size of the suggestions is proportional to the respective confidence score.

16. A computing device, comprising:

a processor; and a memory device including instructions that, when executed by the processor, cause the computing device to:

obtain character input entered into an interface of a computing device;

analyze the character input to determine a plurality of suggestions for completing words, the plurality of suggestions are based at least in part upon the character input, the suggestions having respective confidence scores, wherein a first suggestion of the plurality of suggestions is designated as one of a correction type, a common base portion type, or a completion type, the common base portion type including at least a root word, the completion type including at least a corresponding completing word;

determine a spatial layout of at least a portion of the plurality of suggestions, a location of a suggestion of the portion being determined based, at least in part, upon the respective confidence score of the suggestion, wherein first suggestions that share a same completion type are grouped together in a first group, second suggestions that share a same correction type are grouped together in a second group, and third suggestions that share a same common base portion type are grouped together in a third group;

display the at least the portion of the plurality of suggestions arranged according to the spatial layout, wherein the first suggestions that form the first group, the second suggestions that form the second group and the third suggestions that form the third group are displayed proximate to one another in the spatial layout;

detect a user selection of a specified selection of the plurality of suggestions displayed according to the spatial layout; and modify the character input to correspond to the specified selection.

17. The computing device of claim 16, wherein the instructions when executed further cause the computing device to:

determine at least one font characteristic for a suggestion of the spatial layout based at least in part upon the respective confidence score of the suggestion, the font characteristic including at least one of font size, font style, font color, font bold level, font italicize level, font animation, and font angle.

18. The computing device of claim 16, wherein the instructions when executed further cause the computing device to:

display suggestions that include the root word proximate one another in the spatial layout.

19. The computing device of claim 16, wherein the instructions when executed further cause the computing device to:

display suggestions of a completion type proximate one another and suggestions of a correction type proximate one another according to the spatial layout.

20. A non-transitory computer-readable storage medium storing instructions that, when executed by at least one processor of a computing device, cause the computing device to:

detect character input entered into an interface of a computing device;

analyze the character input to determine a plurality of suggestions, the plurality of suggestions are based at least in part upon the character input, the suggestions having respective confidence scores, wherein a first suggestion of the plurality of suggestions is designated as one of a correction type, a common base portion type, or a completion type, the common base portion type including at least a root word, the completion type including at least a corresponding completing word;

determine a two-dimensional spatial layout of at least a portion of the plurality of suggestions, a location of a suggestion of the portion being determined based at least in part upon the respective confidence score of the suggestion, wherein first suggestions that share a same completion type are grouped together in a first group, second suggestions that share a same correction type are grouped together in a second group, and third suggestions that share a same common base portion type are grouped together in a third group;

display the at least the portion of the plurality of suggestions arranged according to the spatial layout, wherein the first suggestions that form the first group, the second suggestions that form the second group and the third suggestions that form the third group are displayed proximate to one another in the spatial layout;

detect a user selection of a specified selection of the plurality of suggestions displayed according to the spatial layout; and determine a modified character input based at least in part on the specified selection.

21. The non-transitory computer-readable storage medium of claim 20, wherein the instructions when executed further cause the computing device to:

display a second portion of the plurality of suggestions arranged according to the spatial layout, the second portion including one or more additional suggestions related to the specified selection.

22. The non-transitory computer-readable storage medium of claim 20, wherein the instructions when executed further cause the computing device to:

providing for display new suggestions arranged according to the spatial layout in response to at least one of addition, deletion, or alteration of at least one character in the character input.

23. The non-transitory computer-readable storage medium of claim 20, wherein the instructions when executed further cause the computing device to:

determine at least one font characteristic for a suggestion of the spatial layout based, at least in part, upon the respective confidence score of the suggestion, the at least one font characteristic including at least one of font size, font style, font color, font bold level, font italicize level, font animation, and font angle.

24. The method of claim 1, wherein a suggestion is a word suggestion based on the character input, and is designated as one of the correction type, the common base portion type, or the completion type.

* * * * *